(12) United States Patent
Suzuki et al.

(10) Patent No.: US 9,174,690 B2
(45) Date of Patent: Nov. 3, 2015

(54) WIRING STRUCTURE TO SUPPLY POWER TO LICENSE LIGHT OF TWO-WHEELED VEHICLE

(75) Inventors: Koji Suzuki, Wako (JP); Kazuhiko Ono, Wako (JP); Katsuhisa Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 158 days.

(21) Appl. No.: 13/038,400

(22) Filed: Mar. 2, 2011

(65) Prior Publication Data

US 2011/0241422 A1 Oct. 6, 2011

(30) Foreign Application Priority Data

Mar. 31, 2010 (JP) ................. 2010-082740

(51) Int. Cl.
| | |
|---|---|
| H01B 7/00 | (2006.01) |
| B62J 6/18 | (2006.01) |
| B62J 15/00 | (2006.01) |
| B62J 6/00 | (2006.01) |
| B62J 9/00 | (2006.01) |
| B60Q 1/56 | (2006.01) |

(52) U.S. Cl.
CPC ... *B62J 6/18* (2013.01); *B60Q 1/56* (2013.01); *B62J 6/00* (2013.01); *B62J 9/001* (2013.01); *B62J 15/00* (2013.01); *H01B 7/0045* (2013.01)

(58) Field of Classification Search
CPC ............ B62J 9/001; B62J 9/00; B62J 15/00; B62J 6/18; H01B 7/0045; B60Q 1/56
USPC ...................................................... 174/72 A
See application file for complete search history.

(56) References Cited

U.S. PATENT DOCUMENTS

| | | | | |
|---|---|---|---|---|
| 1,795,940 | A | * | 3/1931 | Falge ............................. 362/498 |
| 3,941,994 | A | * | 3/1976 | Petty et al. .................... 362/506 |
| 4,189,762 | A | * | 2/1980 | Nakazawa ..................... 362/475 |
| 4,204,191 | A | * | 5/1980 | Daniels .......................... 340/432 |
| 4,790,087 | A | * | 12/1988 | Hamada et al. ................. 40/204 |
| 4,845,599 | A | * | 7/1989 | Lievin ............................ 362/473 |
| 4,958,451 | A | * | 9/1990 | Iwakura et al. ................. 40/204 |
| 4,970,630 | A | * | 11/1990 | Mudrovich .................... 362/476 |
| 5,197,795 | A | * | 3/1993 | Mudrovich .................... 362/473 |
| 5,276,593 | A | * | 1/1994 | Lighthill et al. ............... 362/473 |
| 5,418,696 | A | * | 5/1995 | Izzo, Sr. ......................... 362/473 |
| 5,617,303 | A | * | 4/1997 | Izzo, Sr. ......................... 362/473 |

(Continued)

FOREIGN PATENT DOCUMENTS

JP         2009-012642     *    1/2009    ............... B62J 15/00

*Primary Examiner* — David M Sinclair
*Assistant Examiner* — Theron Milliser
(74) *Attorney, Agent, or Firm* — Mori & Ward, LLP (57) ABSTRACT

A wiring structure to supply power to a license light provided in a two-wheeled vehicle includes a wire, a connector, a vehicle-body-side harness, and a plug. The wire is connected to the license light attached to a fender support. The fender support is attached to a back surface of a rear fender which is detachably attached to a vehicle body. The connector is attached to a leading end of the wire and to the fender support. The vehicle-body-side harness is fastened to a vehicle-body frame with a fastener at a position lower than an attachment position of the connector. The vehicle-body-side harness extends upward toward the connector. The plug is provided to the vehicle-body-side harness and is connected to the connector to supply power from the vehicle body to the license light.

18 Claims, 7 Drawing Sheets

(56) References Cited

U.S. PATENT DOCUMENTS

| | | | | |
|---|---|---|---|---|
| 5,713,653 A * | 2/1998 | White et al. | | 362/473 |
| 5,722,768 A * | 3/1998 | Suzuki et al. | | 362/265 |
| 5,933,076 A * | 8/1999 | Babb | | 340/475 |
| 6,053,626 A * | 4/2000 | Zagrodnik et al. | | 362/473 |
| 6,073,948 A * | 6/2000 | Motojima et al. | | 280/152.2 |
| 6,104,099 A * | 8/2000 | Mizuta et al. | | 307/9.1 |
| 6,120,167 A * | 9/2000 | Nace | | 362/473 |
| 6,135,625 A * | 10/2000 | Kodaira et al. | | 362/476 |
| 6,302,568 B1 * | 10/2001 | Ohtaki | | 362/546 |
| 6,491,315 B2 * | 12/2002 | Hagen et al. | | 280/164.1 |
| 6,582,001 B2 * | 6/2003 | Yagisawa et al. | | 296/37.1 |
| 6,690,266 B1 * | 2/2004 | Jack et al. | | 340/432 |
| 7,073,618 B1 * | 7/2006 | Song | | 180/219 |
| 7,108,407 B2 * | 9/2006 | Kashiwagi | | 362/473 |
| 7,234,559 B2 * | 6/2007 | Nakano et al. | | 180/219 |
| 7,559,679 B2 * | 7/2009 | Isayama et al. | | 362/522 |
| 7,850,556 B2 * | 12/2010 | Meggiolan | | 474/70 |
| 7,871,188 B1 * | 1/2011 | Turby | | 362/473 |
| 7,972,142 B2 * | 7/2011 | Swiatek et al. | | 439/34 |
| 2001/0027888 A1 * | 10/2001 | Scherbarth | | 180/219 |
| 2002/0029917 A1 * | 3/2002 | Galbraith et al. | | 180/219 |
| 2003/0132048 A1 * | 7/2003 | Hata | | 180/219 |
| 2003/0157830 A1 * | 8/2003 | Inagaki et al. | | 439/573 |
| 2004/0130901 A1 * | 7/2004 | Kashiwagi | | 362/473 |
| 2004/0170024 A1 * | 9/2004 | Sheu et al. | | 362/473 |
| 2009/0196056 A1 * | 8/2009 | Kageyama | | 362/473 |

* cited by examiner

WIRING STRUCTURE TO SUPPLY POWER TO LICENSE LIGHT OF TWO-WHEELED VEHICLE

CROSS-REFERENCE TO RELATED APPLICATIONS

The present application claims priority under 35 U.S.C. §119 to Japanese Patent Application No. 2010-082740, filed Mar. 31, 2010. The contents of this application are incorporated herein by reference in their entirety.

BACKGROUND OF THE INVENTION

1. Field of the Invention

The present invention relates to a wiring structure to supply power to a license light of a two-wheeled vehicle.

2. Discussion of the Background

It is mandatory that a motorcycle be provided with a license plate (a so-called number plate) attached to a rear portion thereof. In addition, a license light for illuminating the license plate is provided in the rear portion of a vehicle body. The license light is supplied with power from a vehicle-mounted battery and the like through wiring.

A motorcycle with such a license light attached to its rear fender is known (for example, see Japanese Patent Application Publication No. 2009-12642 (FIG. 10)).

As shown in FIG. 10 of Japanese Patent Application Publication No. 2009-12642, a license light (11) is attached to a rear fender (42), and a wire (81) is extended from the rear fender (42) frontward in the vehicle. Note that the number in the parentheses indicates reference numeral used in Japanese Patent Application Publication No. 2009-12642.

In some cases of an inspection, maintenance and the like of the motorcycle, the rear fender (42) is removed.

In a small motorcycle, the rear fender (42) is small and light weight. This means that provision of a sufficient extra length to the wire (81) in advance makes it possible to remove the rear fender (42) (move within a certain distance as a limit) from the vehicle body while extending the wire (81).

However, the provision of the sufficient extra length to the wire (81) requires the wire (81) to be prevented from loosening and to be folded to be housed inside the vehicle body. This may lead to increase in cost.

Meanwhile, some of large motorcycles, having large and heavy rear fenders (42), are designed such that the wire (81) is detached from the license light (11) in advance, and then, the rear fender (42) is removed from the vehicle body.

In order to enable the wire (81) to be detached from the license light (11) in a state where the rear fender (42) is attached to the vehicle body, the rear fender (42) needs to have a structure allowing work on the rear fender (42), such as the provision of a maintenance lid in the rear fender (42). In addition, since a required work space increases, the structure of the rear fender (42) becomes complicated.

Thus, there is a demand for a wiring structure enabling attachment and detachment of the wire (81) in a small work space while avoiding excessive increase in length of the wire (81).

SUMMARY OF THE INVENTION

According to one aspect of the present invention, a wiring structure to supply power to a license light provided in a two-wheeled vehicle includes a wire, a connector, a vehicle-body-side harness, and a plug. The wire is connected to the license light attached to a fender support. The fender support is attached to a back surface of a rear fender which is detachably attached to a vehicle body. The connector is attached to a leading end of the wire and to the fender support. The vehicle-body-side harness is fastened to a vehicle-body frame with a fastener at a position lower than an attachment position of the connector. The vehicle-body-side harness extends upward toward the connector. The plug is provided to the vehicle-body-side harness and is connected to the connector to supply power from the vehicle body to the license light.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments of the present invention will be described below based on the attached drawings, wherein like reference numerals designate corresponding or identical elements throughout the various drawings. Note that the drawings are to be viewed in a direction in which reference numerals can be read properly.

An embodiment of the present invention will be described based on the drawings.

Figure 1:
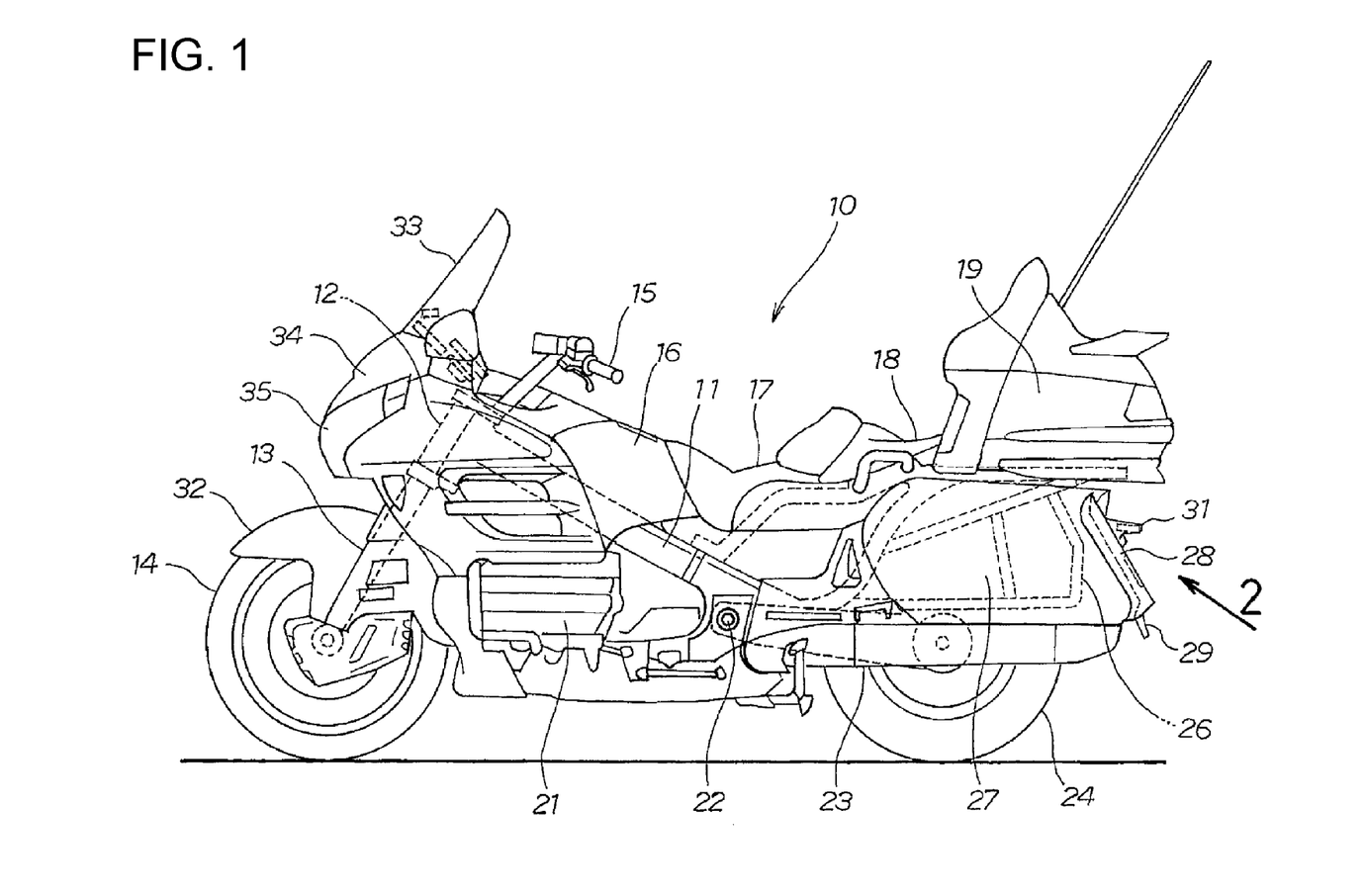
FIG. 1 is a left-side view of a two-wheeled vehicle according to an embodiment of the present invention.

As shown in FIG. 1, a two-wheeled vehicle 10 is a motorcycle type vehicle with the following configuration. A front fork 13 is steerably attached to a head pipe 12 of a vehicle-body frame 11. A front wheel 14 is attached to a lower portion of the front fork 13, and a handlebar 15 operated by a rider is provided at an upper portion of the front fork 13. On the vehicle-body frame 11, a fuel tank 16, a rider seat 17, a pillion seat 18, and a large trunk box 19 are provided in this order from the handlebar 15 to the rear of the vehicle. An engine 21 is disposed below the vehicle-body frame 11. A swing arm 23 extends from a rear-lower portion of the vehicle-body frame 11 with a pivot shaft 22 located in between. The swing arm 23 is provided with a rear wheel 24, and the rear wheel 24 is driven by the engine 21. Rear frames 26 extend toward the rear of the vehicle from a rear portion of the vehicle-body frame 11, and saddle bags 27 are attached to the rear frames 26, respectively. Rear surfaces of the saddle bags 27 are covered with saddle bag covers 28. A rear fender 29 is disposed near the saddle bag covers 28, and a license light 31 is provided in the rear fender 29.

Note that a front fender 32 is provided to the front fork 13, a shield 33 is disposed frontward of the handlebar 15, a front cowl 34 is disposed frontward of the fuel tank 16, and lights 35 such as a headlight are attached to the front cowl 34.

A positional relationship among the saddle bag covers 28 and the rear fender 29 will be described in detail.

Figure 2:
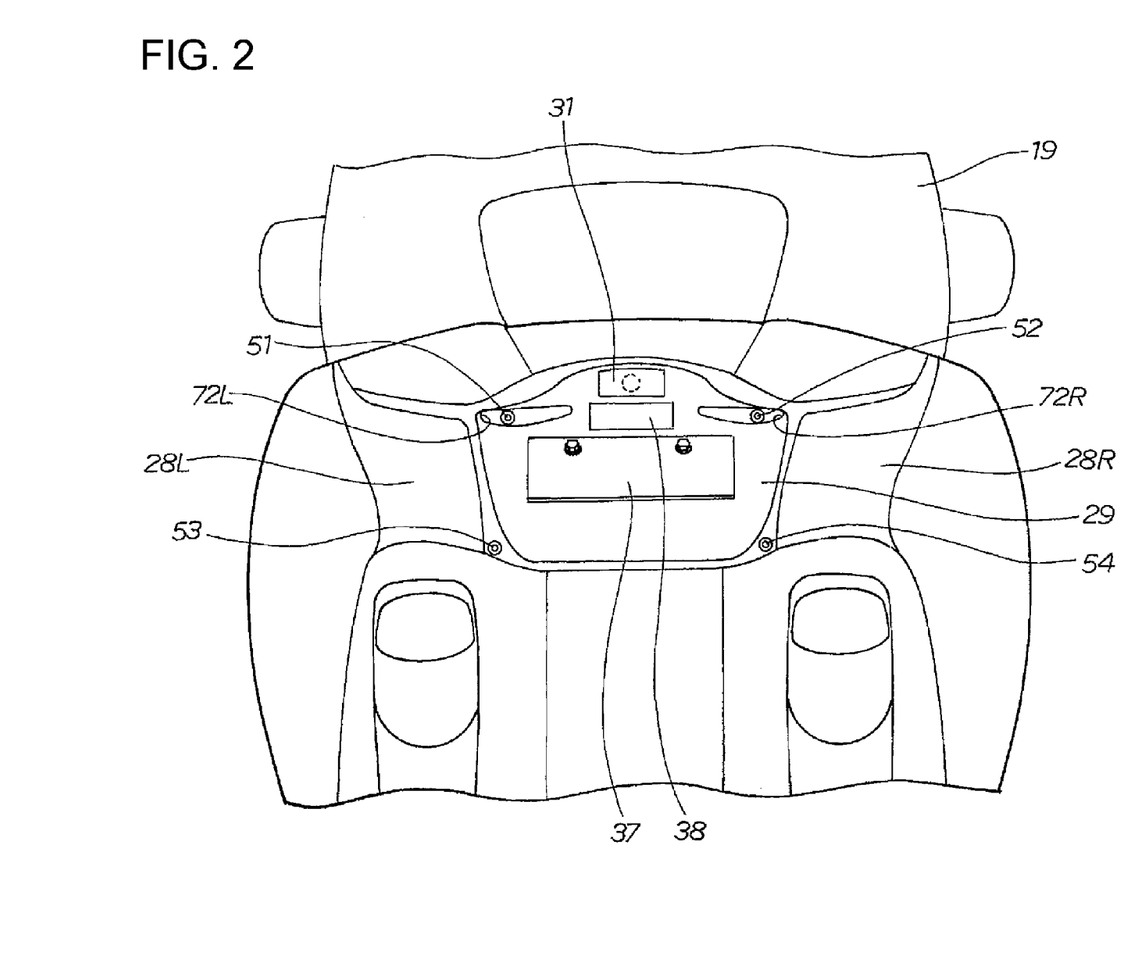
FIG. 2 is a view seen in a direction of an arrow 2 in FIG. 1.

As shown in FIG. 2, the rear fender 29 is disposed at the center in the vehicle-width direction in a manner being interposed between the right and left saddle bag covers 28R, 28L (R is a suffix indicating the right, and L is a suffix indicating the left. The same applies hereafter). A license plate 37, a reflector 38, and the license light 31 illuminating the license plate 37 are provided in the rear fender 29 in this order from the lower side to the upper side.

In this example, since the rear fender 29 is detachably supported by the saddle bag covers 28R, 28L, the saddle bag covers 28R, 28L correspond to a "vehicle body" which supports the rear fender 29. Note that a member which supports the rear fender 29 may be the vehicle-body frame 11, a stay extended from the vehicle-body frame 11, or a rear cover covering the vehicle-body frame 11.

The saddle bag covers 28R, 28L, the vehicle-body frame 11, the stay, the rear cover, and the like are collectively called the "vehicle body" which supports the rear fender 29.

In order to detach the rear fender 29 from the vehicle body, four screws 51 to 54 are firstly unfastened and then removed.

Figure 3:
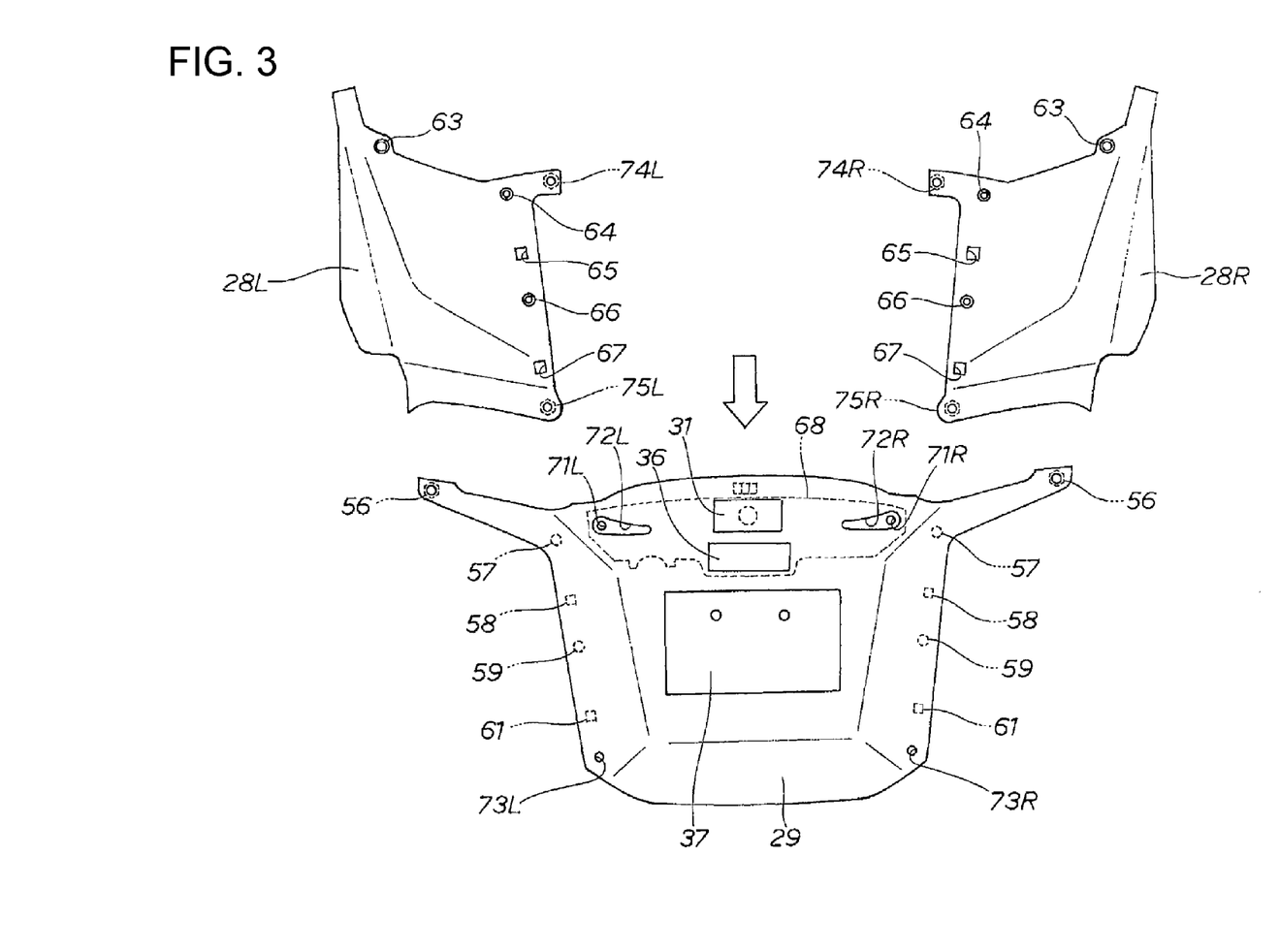
FIG. 3 is an exploded view for explaining a relationship among a rear fender and saddle bag covers.

Thus, as shown in FIG. 3, the rear fender 29 can be detached from the right and left saddle bag covers 28R, 28L, as shown by an outlined arrow.

To be specific, protrusions 56, 57, claws 58, protrusions 59, and claws 61 extend frontward in the vehicle from right and left side portions of the rear fender 29. In correspondence with these protrusions and claws, grommets 63, 64, claw hooking holes 65, grommets 66, and claw hooking holes 67 are provided in the right and left saddle bag covers 28R, 28L. The rear fender 29 is detachably fastened to the right and left saddle bag covers 28R, 28L in a manner that the protrusions 56, 57 are inserted into the grommets 63, 64, and the claws 58 are hooked onto the claw hooking holes 65.

In addition, a horizontally long fender support 68 is attached to an upper portion of the back surface of the rear fender 29. Two right and left screw holes 71R, 71L are provided in the fender support 68.

These screw holes 71R, 71L can be observed from the rear side of the vehicle through horizontally long elongated holes 72R, 72L opened in the rear fender 29.

Furthermore, two right and left screw holes 73R, 73L are provided in a lower portion of the rear fender 29.

Nuts 74R, 74L are provided in upper portions of the right and left saddle bag covers 28R, 28L in correspondence with the upper screw holes 71R, 71L. Nuts 75R, 75L are provided in lower portions of the right and left saddle bag covers 28R, 28L in correspondence with the lower screw holes 73R, 73L.

The rear fender 29 is made to overlap the right and left saddle bag covers 28R, 28L from the vehicle rear side. Thereafter, the screw (reference numeral 51 in FIG. 2) is inserted into the left screw hole 71L of the fender support 68, and then screwed into the nut 74L of the left saddle bag cover 28L. Similarly, the screw (reference numeral 52 in FIG. 2) is inserted into the right screw hole 71R of the fender support 68, and then screwed into the nut 74R of the right saddle bag cover 28R.

Similarly, the screws (reference numerals 53, 54 in FIG. 2) are inserted into the right and left screw holes 73R, 73L of the rear fender 29, and then screwed into the nuts 75R, 75L of the right and left saddle bag covers 28R, 28L.

Since the screws are fastened as described above, the rear fender 29 can be moved downward from the right and left saddle bag covers 28R, 28L as shown by the outlined arrow, by removing the screws (reference numerals 51 to 54 in FIG. 2), then by slightly pulling the rear fender 29 to detach the protrusions 56 from the grommets 63, and so on.

Next, the structure of the back surface of the rear fender 29 will be described.

Figure 4:
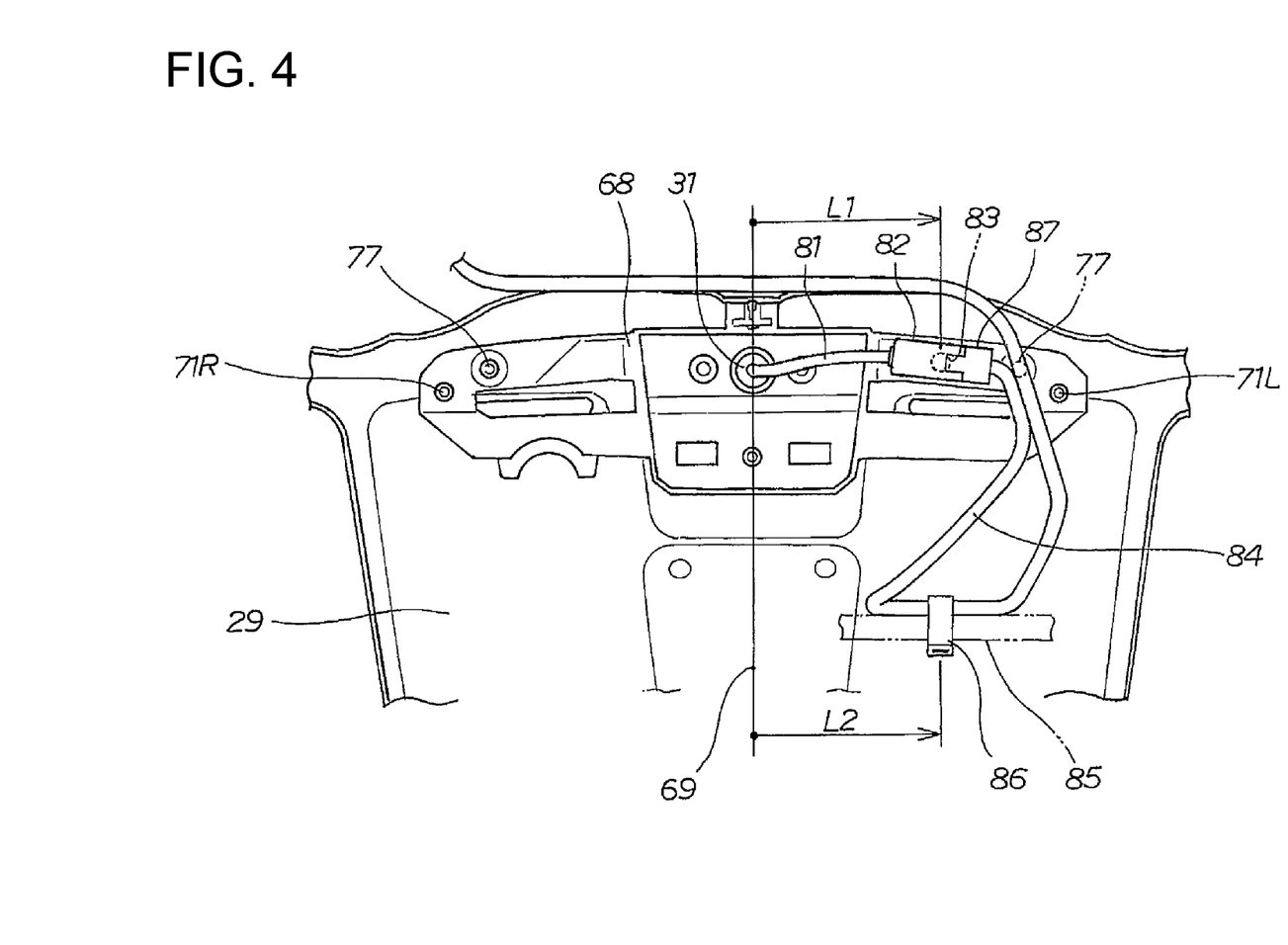
FIG. 4 is a back view of the rear fender.

As shown in FIG. 4, the fender support 68 is fixed to the back surface of the rear fender 29 by bolts 77, 77. There can be seen the screw holes 71R, 71L (since this is a back view, R and L are reversed) respectively on the outer sides of the bolts 77, 77 in the vehicle-width direction.

The license light 31 is attached to the center (corresponding to the vehicle width center) of the fender support 68. A wire 81 extends to either the right or left (left with respect to the rider in this example) in the vehicle-width direction from the license light 31, and a connector 82 is attached to its end. The connector 82 is fixed to the fender support 68 by a clip 83.

Meanwhile, a vehicle-body-side harness 84 extending from the vehicle body side runs through the vehicle width center along a portion near the top edge of the rear fender 29 from right to left (or from left to right) in the vehicle-width direction. Then, the vehicle-body-side harness 84 runs downward and is fastened to a rear-frame end pipe 85 shown in imaginary lines by a fastener 86 such as a wiring band. Thereafter, the vehicle-body-side harness 84 runs upward toward the connector 82. A plug 87 is provided at the end of the vehicle-body-side harness 84, and is fitted to the connector 82.

It is preferable that a distance L1 between a vehicle width center 69 and the attachment position where the connector 82 is attached to the fender support 68 is equal or almost equal to a distance L2 between the vehicle width center 69 and the fastening position where the fastener 86 is fastened to the rear-frame end pipe 85.

An operation of the wiring structure of the license light 31 described above will be described next.

Figure 5:
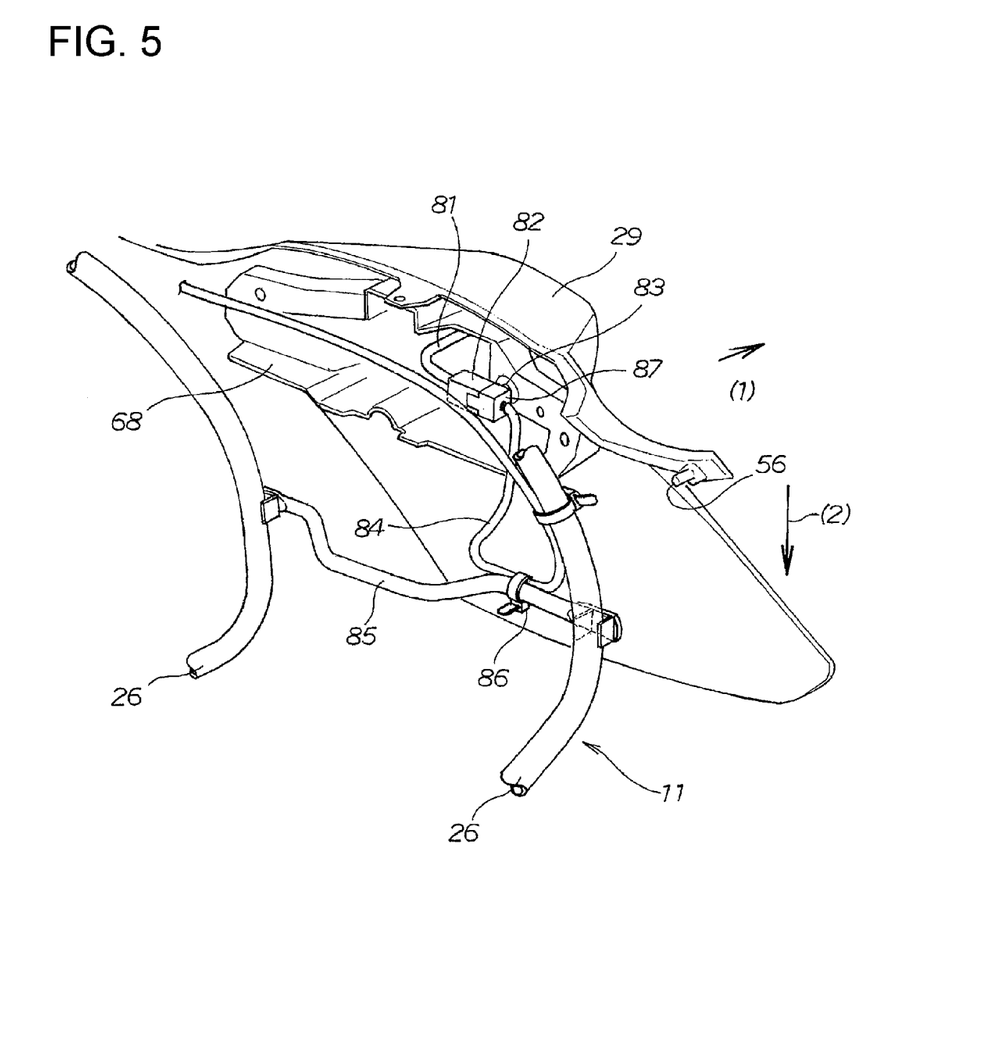
FIG. 5 is a view for explaining a relationship between a vehicle-body frame and the rear fender.

As shown in FIG. 5, the rear-frame end pipe 85 connects the rear frames 26, 26 of the vehicle-body frame 11 in the vehicle-width direction. The fastener 86 is fastened to the rear-frame end pipe 85.

From the state shown in FIG. 5, the rear fender 29 is moved slightly toward the rear of the vehicle (arrow (1)). Then, the rear fender 29 is lowered as shown by an arrow (2).

Figure 6:
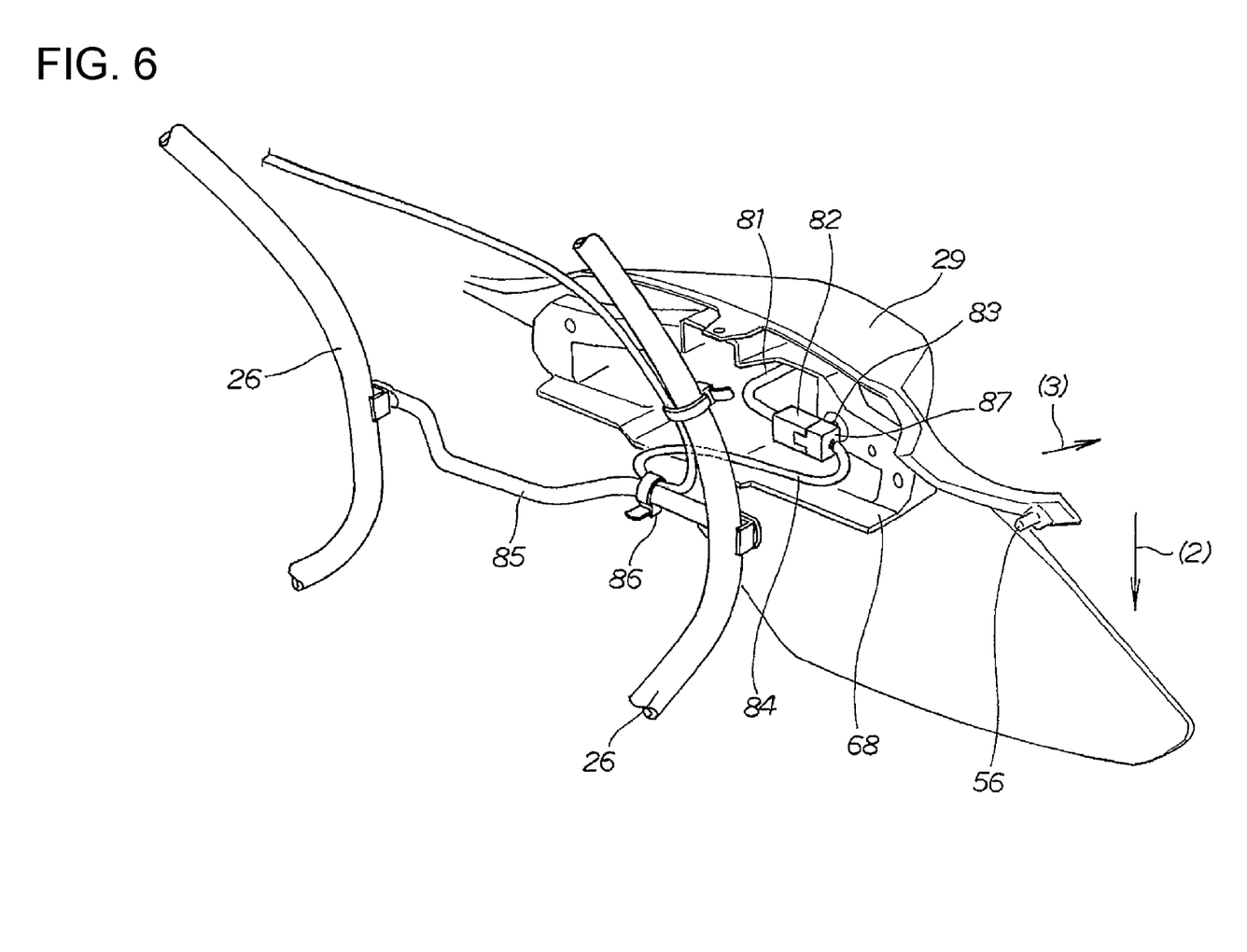
FIG. 6 is an operation explanatory view of FIG. 5.

Then, as shown in FIG. 6, the vehicle-body-side harness 84 between the fastener 86 and the connector 82 becomes loose in a meandering manner. By using this looseness, the rear fender 29 is allowed to move toward the rear of the vehicle (arrow (3)). Accordingly, a work space is secured, and the connector 82 can be easily detached from the plug 87 by putting the hand into this work space from above.

A description is again given of the above operation while focusing on the license light 31.

Figure 7A:
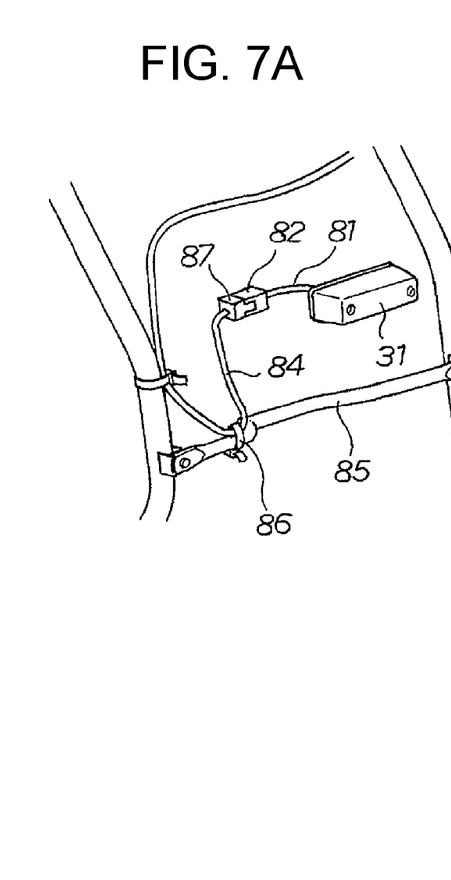
FIGS. 7A, 7B and 7C are views for explaining changes in position of the license light.

FIG. 7A shows how high the license light 31 is located when the rear fender 29 is attached to the vehicle. Here, the vehicle-body-side harness 84 from the fastener 86 to the plug 87 runs almost vertically.

Figure 7B:
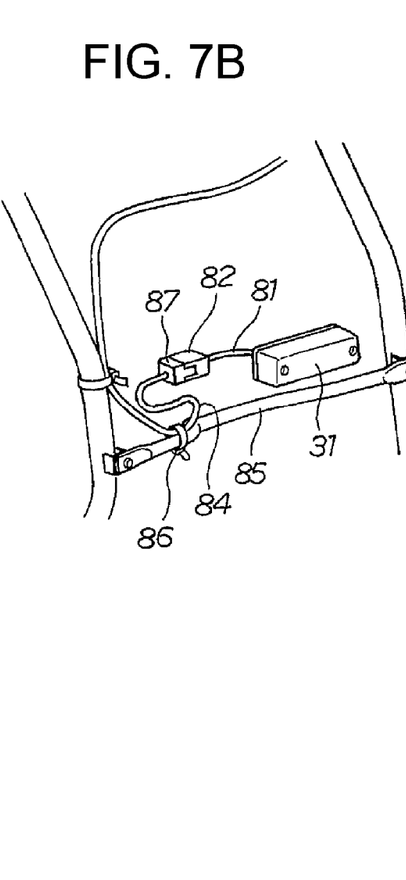
Figure 7C:
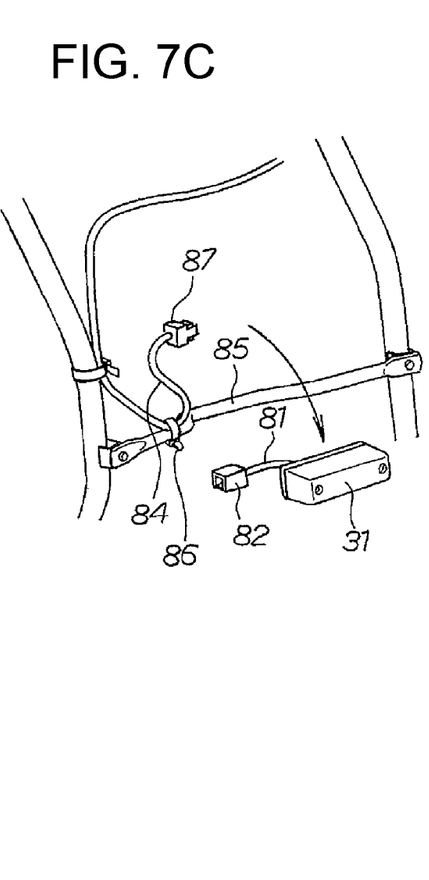

FIG. 7B shows how high the license light 31 is positioned when the rear fender 29 is lowered from the vehicle. Here, the vehicle-body-side harness 84 from the fastener 86 to the plug 87 is loose and meanders. In this state, the plug 87 is detached from the connector 82. Thereafter, as shown in FIG. 7C, the license light 31 together with the rear fender 29 can be completely detached from the vehicle body.

Effects of the above-described operation of the embodiment of the present invention will be described based on the drawings.

As shown in FIG. 4, the vehicle-body-side harness 84 is fastened to the vehicle-body frame 11 (rear-frame end pipe 85) by the fastener 86, and then extends upward toward the connector 82 at the end of the wire 81 connected to the license light 31.

The rear fender 29 is pulled toward the rear of the vehicle (arrow (3) in FIG. 6) while being moved downward from the vehicle body after fastening members such as the screws are removed.

Since the vehicle-body-side harness 84 is fastened to the rear-frame end pipe 85 by the fastener 86 and then extends upward, the lowering of the rear fender 29 causes a sag of the vehicle-body-side harness 84. The sag produces room for pulling the rear fender 29 toward the rear of the vehicle (arrow (3) in FIG. 6).

The vehicle-body-side harness 84 only needs to be extended upward, and is not required to be excessively loose. Thus, the vehicle-body-side harness 84 can have the shortest required length. Since there is no excessive looseness, the wiring (harness 84) can be made simple as shown in FIG. 4. Moreover, since there is no need to make the wiring long, cost reduction can be achieved.

The work space is produced by pulling the rear fender 29 toward the rear of the vehicle. As shown in FIG. 4, since the connector 82 is disposed in the upper portion of the back surface of the rear fender 29, the connector 82 can be easily recognized by looking into the work space from above. By detaching the plug 87 from the connector 82, the wire 81 connected the license light 31 can be easily separated from the vehicle-body-side harness 84. Thus, only a small work space is required.

Furthermore, the length of a portion of the vehicle-body-side harness 84 extending upward toward the connector 82 is set equal to or more than a moving distance required to detach the rear fender 29.

Since the length of this portion of the harness 84 serves as a margin for the work, the detachment of the rear fender 29 can be facilitated without applying unnecessary excessive force on the harness 84. In addition, the length of the harness 84 can be optimized.

Moreover, in a front view of the vehicle, the connector 82 is attached to the fender support 68 at a position on either the right or left side of the license light 31 in the vehicle-width direction.

Since the connector 82 can be disposed in the upper portion of the back surface of the rear fender 29, the attachment and detachment work of the connector 82 and the plug 87 can be performed easily from above.

In addition, the connector 82 is disposed away from the license light 31 on either the right or left side thereof in the vehicle-width direction. Thus, there is no concern that the license light 31 lowered together with the rear fender 29 interferes with the vehicle-body-side harness 84.

Furthermore, the fastener 86 can be fastened to the rear-frame end pipe 85.

Specifically, the vehicle-body-side harness 84 is fastened by using the rear-frame end pipe 85 connecting the rear portions of the vehicle-body frame 11 in the vehicle-width direction. Since there is no need to extend a stay dedicated to the vehicle-body-side harness 84 from the vehicle-body frame 29, increase in number of parts can be prevented.

Moreover, the distance L1 between the vehicle width center 69 and the attachment position (the center of the clip 83) where the connector 82 is attached to the fender support 68 is equal or almost equal to the distance L2 between the vehicle width center 69 and the fastening position where the fastener 86 is fastened. Since the fastening position is located directly below the attachment position, the portion of the vehicle-body-side harness 84 extending upward toward the connector 82 can be made as short as possible.

Note that the embodiment of the present invention is suitable for a large motorcycle type vehicle, but there is no problem in applying the embodiment of the present invention to a small motorcycle type vehicle or to a scooter type vehicle.

According to the embodiment of the present invention, the vehicle-body-side harness is fastened to the vehicle-body frame by the fastener, and then extends upward toward the connector at the end of the wire connected to the license light.

The rear fender to which the license light is attached is pulled toward the rear of the vehicle while being moved downward from the vehicle body after fastening members such as screws are removed. Since the vehicle-body-side harness is fastened by the fastener to the vehicle-body frame at a position below the attachment position of the connector and then extends upward, lowering of the rear fender causes a sag of the vehicle-body-side harness. The sag produces room for pulling the rear fender toward the rear of the vehicle.

The vehicle-body-side harness only needs to be extended upward, and is not required to be excessively loose. Thus, the vehicle-body-side harness can have the shortest required length. Since there is no excessive looseness, the wiring can be made simple. Moreover, cost reduction can be achieved.

By pulling the rear fender toward the rear of the vehicle, a work space is made. Since the connector is disposed in the upper portion of the back surface of the rear fender, the connector can be easily observed by looking into the work space from above. By detaching the connector from the plug, the wire connected to the license light can be easily separated from the vehicle-body-side harness. Thus, only a small work space is required.

According to the embodiment of the present invention, excessive increase in length of the wiring can be avoided and attachment and detachment of the wiring can be performed in a small work space. Thus, removal work of the rear fender is facilitated, and the wiring structure of the license light of the two-wheeled vehicle which enables improvement in work efficiency is provided.

According to the embodiment of the present invention, the length of the portion of the vehicle-body-side harness extending upward toward the connector is set equal to or more than the moving distance required to detach the rear fender.

Since the length of this portion of the harness serves as a margin for the work, the detachment of the rear fender is facilitated without applying an unnecessary excessive force on the harness. In addition, the length of the harness can be optimized.

According to the embodiment of the present invention, in a front view of the vehicle, the connector is attached to the fender support at a position on either the right or left side of the license light in a vehicle-width direction.

Since the connector can be disposed in the upper portion of the back surface of the rear fender, the attachment and detachment work of the connector and the plug can be performed easily from above.

In addition, the connector is disposed away from the license light on either the right or left side thereof in the vehicle-width direction. Thus, there is no concern that the license light lowered together with the rear fender interferes with the vehicle-body-side harness.

According to the embodiment of the present invention, the vehicle-body frame to which the fastener is fastened is a rear-frame end pipe.

Specifically, the vehicle-body-side harness is fastened by using the rear-frame end pipe connecting the rear portions of the vehicle-body frame in the vehicle-width direction. Since there is no need to extend a stay dedicated to the vehicle-body-side harness from the vehicle-body frame, increase in number of parts can be prevented.

According to the embodiment of the present invention, a distance between a vehicle width center and the attachment position where the connector is attached to the fender support is equal or almost equal to a distance between the vehicle width center and a fastening position where the fastener is fastened to the vehicle-body frame. Since the fastening position is located directly below the attachment position, the portion of the vehicle-body-side harness extending upward toward the connector can be made as short as possible.

The embodiment of the present invention is suitable for a large motorcycle type vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A wiring structure to supply power to a license light provided in a two-wheeled vehicle, comprising:
   a wire connected to the license light attached to a fender support which is attached to and supports a back surface of a rear fender which has protrusions that are detachably attached to saddle bag covers disposed to cover saddle bags on a vehicle body, the fender support being configured to support the rear fender on the vehicle body;
   a connector attached to a leading end of the wire, the connector being directly attached to the fender support;
   a vehicle-body-side harness fastened to a vehicle-body frame with a fastener at a position lower than an attachment position of the connector, the vehicle-body-side harness extending upward toward the connector, the fastener fastening the vehicle-body-side harness directly to a rear-frame end pipe, the rear-frame end pipe having a longest dimension of the rear-frame end pipe such that the longest dimension of the rear-frame end pipe extends in a vehicle-width direction between rear frames of the vehicle body, the vehicle-width direction extending between a left side of the vehicle body and a right side of the vehicle body; and
   a plug provided to the vehicle-body-side harness and connected to the connector to supply power from the vehicle body to the license light, wherein in a front view of the two-wheeled vehicle, the connector is attached to the fender support at a position on either a right or left side of the license light in the vehicle-width direction, wherein, when the connector and the plug are attached to each other, the connector and the plug extend in the vehicle-width direction, and
   wherein a first distance between a vehicle width center of the vehicle body and an attachment position where the connector is directly attached to the fender support is equal to or substantially equal to a second distance between the vehicle width center and a fastening position where the fastener is directly fastened to the rear-frame end pipe.

2. The wiring structure according to claim 1, wherein a length of a portion, extending upward toward the connector, of the vehicle-body-side harness is set equal to or more than a moving distance required to remove the rear fender.

3. A wiring structure to supply power to a license light provided in a two-wheeled vehicle, comprising:
   a wire connected to the license light attached to a fender support which is attached to and supports a back surface of a rear fender which has protrusions that are detachably attached to saddle bag covers disposed to cover saddle bags on a vehicle body, the fender support being configured to support the rear fender on the vehicle body;
   a connector attached to a leading end of the wire, the connector being directly attached to the fender support;
   a vehicle-body-side harness fastened to a vehicle-body frame with a fastener at a position lower than an attachment position of the connector, the vehicle-body-side harness extending upward toward the connector; and
   a plug provided to the vehicle-body-side harness and connected to the connector to supply power from the vehicle body to the license light,
   wherein in a front view of the two-wheeled vehicle, the connector is attached to the fender support at a position on either a right or left side of the license light in a vehicle-width direction, wherein the leading end of the wire attached to the connector extends directly from a body of the connector in a direction substantially parallel to the vehicle-width direction; and
   wherein, when the connector and the plug are attached to each other, the body of the connector and a body of the plug are aligned in a series arrangement in a direction substantially parallel to the vehicle-width direction.

4. The wiring structure according to claim 3,
   wherein the fastener fastens the vehicle-body-side harness directly to a rear-frame end pipe, the rear-frame end pipe longitudinally extending in a vehicle-width direction between rear frames of the vehicle body, and
   wherein a first distance between a vehicle width center of the vehicle body and an attachment position where the connector is directly attached to the fender support is equal to or substantially equal to a second distance between the vehicle width center and a fastening position where the fastener is directly fastened to the rear-frame end pipe.

5. The wiring structure according to claim 1,
   wherein the connector and the plug are arranged side-by-side in the vehicle-width direction,
   wherein the connector includes a first surface and a second surface opposite to the first surface of the connector in the vehicle-width direction,
   wherein the plug includes a first surface and a second surface opposite to the first surface of the plug in the vehicle-width direction, and
   wherein the second surface of the connector is connected to the first surface of the plug.

6. The wiring structure according to claim 5,
   wherein, when the connector and the plug are attached to each other, a body of the connector directly abuts a body of the plug to form a joined, elongated body that longitudinally extends in a direction substantially parallel to the vehicle-width direction.

7. The wiring structure according to claim 5,
   wherein the first surface of the plug is provided closer to a first side of the vehicle body in the vehicle-width direction than the second surface of the plug, and
   wherein the first surface of the connector is provided closer to the first side of the vehicle body in the vehicle-width direction than the second surface of the connector.

8. The wiring structure according to claim 5,
   wherein the connector is fixed to the fender support by a clip.

9. A vehicle comprising:
   a vehicle body having a rear fender and a fender support which is attached to and supports a back surface of a rear fender, the fender support being configured to support the rear fender on the vehicle body, the vehicle body having a rear-frame end pipe that extends between rear frames of the vehicle body that extend to a rear-side of the vehicle, the rear-frame end pipe having a longest dimension of the rear-frame end pipe such that the longest dimension of the rear-frame end pipe extends in a vehicle-width direction between the rear frames of the vehicle body, the vehicle-width direction extending between a left side of the vehicle body and a right side of the vehicle body;

a light attached to the fender support;

a wire connected to the light to supply power to the light;

a connector attached to a leading end of the wire, the connector being directly attached to the fender support;

a vehicle-body-side harness fastened directly to the rear-frame end pipe with a fastener at a position lower than an attachment position of the connector, the vehicle-body-side harness extending upward toward the connector;

a plug provided to the vehicle-body-side harness and connected to the connector to supply power from the vehicle body to the light;

saddle bags attached to the rear frames; and saddle bag covers that cover rear surfaces of the saddle bags, the saddle bag covers being disposed near the rear fender, wherein in a front view of the two-wheeled vehicle, the connector is attached to the fender support at a position on either a right or left side of the light in the vehicle-width direction, wherein, when the connector and the plug are attached to each other, the connector and the plug extend in the vehicle-width direction, and wherein a first distance between a vehicle width center of the vehicle body and an attachment position where the connector is directly attached to the fender support is equal to or substantially equal to a second distance between the vehicle width center and a fastening position where the fastener is directly fastened to the rear-frame end pipe, and wherein the rear fender includes protrusions, the protrusions being detachably attached to the saddle bag covers to fasten the rear fender to the saddle bag covers.

10. The vehicle according to claim 9, wherein the leading end of the wire attached to the connector extends directly from a body of the connector in a direction substantially parallel to the vehicle-width direction; and wherein, when the connector and the plug are attached to each other, the body of the connector and a body of the plug are aligned in a series arrangement in a direction substantially parallel to the vehicle-width direction.

11. The vehicle according to claim 9, wherein a length of a portion, extending upward toward the connector, of the vehicle-body-side harness is set equal to or more than a moving distance required to remove the rear fender.

12. The vehicle according to claim 9, wherein the connector and the plug are arranged side-by-side in the vehicle-width direction, wherein the connector includes a first surface and a second surface facing opposite to the first surface of the connector along the vehicle-width direction, wherein the plug includes a first surface and a second surface facing opposite to the first surface of the plug along the vehicle-width direction, and wherein the second surface of the connector directly abuts and is connected to the first surface of the plug.

13. The vehicle according to claim 12, wherein, when the connector and the plug are attached to each other, a body of the connector directly abuts a body of the plug to form a joined, elongated body that longitudinally extends in a direction substantially parallel to the vehicle-width direction.

14. The vehicle according to claim 12, wherein the first surface of the plug is provided closer to a first side of the vehicle body in the vehicle-width direction than the second surface of the plug, and wherein the first surface of the connector is provided closer to the first side of the vehicle body in the vehicle-width direction than the second surface of the connector.

15. The vehicle according to claim 12, wherein the connector is directly fixed to the fender support by a clip.

16. The wiring structure according to claim 1, wherein the vehicle-body-side harness is a wiring harness having the plug provided on a terminal end of the wiring harness.

17. The wiring structure according to claim 3, wherein the vehicle-body-side harness is a wiring harness having the plug provided on a terminal end of the wiring harness.

18. The vehicle according to claim 9, wherein the vehicle-body-side harness is a wiring harness having the plug provided on a terminal end of the wiring harness.

* * * * *